United States Patent [19]
Turner et al.

[11] 3,915,640
[45] Oct. 28, 1975

[54] METHOD AND COMPOSITION FOR DETECTING FIBRIN MONOMERS AND FIBRIN DEGRADATION PRODUCTS

[75] Inventors: James E. Turner, Madison; James R. Butler, Parsippany; Arthur L. Babson, Chester, all of N.J.

[73] Assignee: Warner-Lambert Company, Morris Plains, N.J.

[22] Filed: Aug. 6, 1974

[21] Appl. No.: 495,161

[52] U.S. Cl.................... 23/230 B; 252/408; 424/7
[51] Int. Cl.².................. G01N 21/04; G01N 33/16
[58] Field of Search......... 23/230 B; 252/408; 424/7

[56] References Cited
UNITED STATES PATENTS

| | | | |
|---|---|---|---|
| 3,778,352 | 12/1973 | Bishop | 23/230 B |
| 3,783,103 | 1/1974 | Bishop | 23/230 B |
| 3,797,999 | 3/1974 | Witz | 23/230 B |
| 3,849,653 | 11/1974 | Sakaide | 23/230 B X |

OTHER PUBLICATIONS
Chemical Abstracts, 70: 45644z (1969).
Chemical Abstracts, 72: 38954p (1970).
Chemical Abstracts, 75: 94615c (1971).
Chemical Abstracts, 75: 107340m (1971).

*Primary Examiner*—Morris O. Wolk
*Assistant Examiner*—Sidney Marantz
*Attorney, Agent, or Firm*—Albert H. Graddis; Frank S. Chow; Anne M. Kelly

[57] ABSTRACT

A method for detecting fibrin and fibrin degradation products in blood plasma which involves mixing the blood sample with a composition containing protamine sulfate and finely divided colored particles and visually observing the resultant colored fibrin strands and colored fibrin gels in a positive test. The composition is prepared by gradually adding a saline solution of the colored particles to a saline solution of the protamine sulfate and the pH is adjusted to $6.5 \pm 0.05$.

16 Claims, No Drawings

METHOD AND COMPOSITION FOR DETECTING FIBRIN MONOMERS AND FIBRIN DEGRADATION PRODUCTS

BACKGROUND OF THE INVENTION

Disease states in which intravascular clotting contributes to the disorder have been increasingly recognized. The disorder generally involves some breakdown in the clotting mechanism which results in abnormal levels of fibrin monomers or fibrin degradation products in blood serum. In a healthy individual, fibrinogen is converted to fibrin by the thrombin in the blood. Disease states characterized by an excess of thrombin cause larger quantities of fibrinogen to be converted into fibrin and a clot results. The clot thus produced is slowly dissolved by the plasmin present and supplies high levels of fibrin monomers and/or fibrin degradation products throughout the body, a condition which is generally known as disseminated intravascular coagulation.

A direct determination of the presence of high levels of thrombin which act to initiate reactions in the blood leading to disseminated intravascular coagulation has not been possible since this enzyme is rapidly inactivated. Therefore, indirect diagnosis of disease states characterized by intravascular coagulation is achieved by identifying the abnormal levels of fibrin monomers and fibrin degradation products which are the result of excess thrombin.

The staphylococcal clumping test has been used to measure intravascular coagulation: Leavelle, Dennis E. et al., *Am. J. Clin. Path.*, 55: p. 452–457, 1971. This test, however, gives positive results for the presence of fibrin degradation products and of fibrinogen degradation products also. Fibrinogen degradation products are produced when an excess of plasmin occurs in the blood, and their presence does not indicate intravascular clotting. Only the presence of abnormal levels of fibrin monomers and/or fibrin degradation products specifically reflects the presence of excess thrombin and subsequent intravascular clotting. Thus, a positive staphylococcal clumping test does not unequivocally serve to diagnose intravascular coagulation.

The detection of soluble fibrin monomers and fibrin degradation products whose presence leads to a confirming diagnosis of intravascular coagulation has been achieved by the use of the protamine sulfate test. Blood plasma which contains soluble fibrin monomers or soluble fibrin degradation products will, upon the addition of protamine sulfate, demonstrate the presence of these substances by the formation of fibrin "gels" or fibrin "strands." Variations of this test have been described in a number of recent papers: Gurewich, V. et al., *Annuals of Internal Medicine*, 75: p. 895–902, 1971; Newiarowski, S. et al., *Journal of Laboratory Clinical Medicine*, 77: p. 666, 1971; Sanfelippo, M. J. et al., *American Journal of Clinical Pathology*, 56: p. 166, 1971.

Although the above-mentioned determinations have vastly improved the likelihood of an accurate and reliable diagnosis of the various disease states involving intravascular clotting, difficulties in identifying low concentrations of fibrin monomers and fibrin degradation products, and in distinguishing end points for positive reactions have been encountered. One interfering factor is that plasma normally contains fibrinogen. While the protamine sulfate precipitates both fibrinogen and fibrinogen degradation products as a white, feathery flocculent product, this product is ordinarily distinguishable from the "gel" or "strand" formed from fibrin monomers or fibrin degradation products in the presence of protamine sulfate. However, at low concentrations, a clear recognition and identification of the thread-like fibrin strands can be extremely difficult, especially in the presence of the feathery and flocculent fibrinogen precipitate.

Thus, the early diagnosis of intravascular coagulation is somewhat uncertain when presently available test methods are relied upon. Therapy for disease conditions involving intravascular coagulation is available but effective use of this therapy depends, to a large extent, on the initiation of therapy prior to tissue damage or malfunction. Therefore, early diagnosis of low levels of intravascular coagulation is critical.

SUMMARY OF THE INVENTION

This invention relates to an improved composition and method for detecting fibrin monomers and fibrin degradation products. The improved composition of the invention contains from 0.0125% to 0.2% by weight, of protamine sulfate in a saline solution, in which there is suspended from about 0.00042% to about 0.00165% by weight, of finely divided colored particles. The pH of the solution is adjusted to 6.5. The improved composition is prepared by dissolving the protamine sulfate in the saline solution, and adjusting the pH; suspending the colored particles (preferably lamp-black, in the form of an India ink) in the saline solution, and slowly adding the suspension of colored particles to the protamine sulfate solution, and adjusting the pH to 6.5. Optionally, the improved test composition may be lyophilized. Determination of low levels of intravascular coagulation in blood plasma is possible using this improved reagent composition.

DESCRIPTION OF THE INVENTION

It has now been found that difficulties encountered in positively identifying low levels of fibrin monomers and fibrin degradation products in blood are overcome by utilizing the improved protamine sulfate test compositions of this invention. Specifically, it has been found that the suspension of finely divided colored particles in protamine sulfate precipitating solutions used for the identification of fibrin monomers in blood plasma provide a more definite positive end point for this test. The added colored particles are colloidally suspended in the protamine sulfate solution and become entrapped as the fibrin strands and fibrin gels precipitate out taking on the color of the particles. Thus, the fibrin strands and fibrin gels are more readily distinguishable even at relatively low concentrations. Through the use of the improved reagent composition of this invention, it has been found that fibrin monomers present in blood plasma at concentrations as low as 0.89 mg per 100 ml of plasma can be detected.

Colored particles which are suitable for use in the improved protamine sulfate reagent composition of this invention include those colored particles having a diameter ranging in size from about 90 to 400 millimicrons, which are capable of being suspended in the protamine sulfate solution.

Thus, colored pigments such as Red Oxide, Yellow Oxide, Carbon Black, Benzidine Orange, Phthalo Green, Phthalo Blue, Ultramarine Blue, Brown Oxide and the like which are available commercially in water dispersions (Landers-Segal Color Company, Brooklyn, N.Y.) may be used in the practice of this invention. The more vividly colored particles are preferable, since they have been found to provide a more easily observable color contrast. Carbon blacks are effective in this regard and lampblack is particularly preferred. One form of lampblack which has been found especially suitable is India ink: the lampblack in India ink is colloidally suspended in an aqueous vehicle to which various gum-like suspending agents are added. A suitable India ink is available from A-W-Faber Castell, Higgins Ink Company, Inc., Brooklyn, N.Y.

In preparing the improved reagent composition for detecting intravascular coagulation according to this invention, the concentration as well as the size of the finely divided colored particles present in the protamine sulfate solution is critical. If too great a concentration is present, some colored particles will remain in suspension as the fibrin gel or strand is formed, and there will not be the necessary contrast between the suspension and the gel or strand to improve visualization of the end product. Similarly, if an insufficient quantity of finely divided colored particles is present, the fibrin strands and/or fibrin gels will be only faintly colored; again no improvement in visualization of the end product will occur.

Thus, for improved detection of fibrin monomers and fibrin degradation products in blood plasma, according to the teachings of this invention, there is provided a saline solution containing from 0.0125% to 0.2% by weight, preferably 0.025% to 0.1% by weight, most preferably 0.1% by weight protamine sulfate, based on the total weight of the saline solution; and from 0.00042% to 0.00165%, preferably 0.00065% to 0.001097%, most preferably 0.00083% by weight of finely divided colored particles based on the total weight of the saline solution, suspended in the saline solution. The pH of the saline solution containing the protamine sulfate and the finely divided colored particles should be adjusted to about 6.50 ± 0.05. Optionally, the improved test composition of this invention may be lyophilized and reconstituted with water for use in determining intravascular coagulation in blood plasma.

To obtain the above-described improved composition for detecting intravascular coagulation, it is necessary to initially prepare a solution of the protamine sulfate in the saline solution containing 0.7% to 0.95% sodium chloride; preferably a physiological saline solution, containing 0.85% sodium chloride, is used. The pH of this solution should be adjusted to about 6.50 ± 0.05. The finely divided colored particles are then suspended in an equal amount of saline solution. Next, a volume of the suspension of colored particles in saline solution is added to an equal volume protamine sulfate saline solution; the pH of the final composition is adjusted to 6.50 ± 0.05. Generally, 0.1 N sodium hydroxide is utilized for pH adjustments. There is thus obtained an improved reagent composition which may be lyophilized for easy shipping and increased stability on storage. It has been found that reconstitution of the lyophilized composition of this invention with water will yield a suspension of the finely divided colored particles in the protamine sulfate saline solution which can be used, without difficulty, to detect intravascular coagulation.

One of the improved methods of this invention for detecting the presence of fibrin monomers and fibrin degradation products in blood plasma utilizes serial dilutions of the improved reagent composition of this invention. The serial dilutions are prepared as follows:

A. A saline solution containing 0.4% by weight of protamine sulfate is prepared and the pH is adjusted to 6.50 ± 0.05.

B. A concentration of 0.00165% by weight of finely divided colored particles is suspended in an additional quantity of saline solution;

C. A volume of the colloidal suspension of colored particles (B) is gradually added to an equal volume of the protamine sulfate saline solution (A) to provide a combined reagent composition containing 0.2% by weight of protamine sulfate and 0.00083% by weight of finely divided colored particles; the pH of this combined composition is again adjusted to 6.50 ± 0.05;

D. A remaining portion of the 0.00165% by weight of colored particles suspended in saline solution is diluted with additional saline solution to obtain a saline solution containing 0.00083% by weight of finely divided colored particles suspended in the saline solution;

E. Four additional serial dilutions of the improved test composition of this invention are obtained by diluting (C) with (D).

Serial dilutions of the improved reagent composition of this invention containing 0.2%, 0.1%, 0.05%, 0.025% and 0.0125% by weight of protamine sulfate are thus obtained; each dilution also contains 0.00083% by weight of finely divided colored particles.

Actual detection of intravascular coagulation utilizing the improved reagent composition of this invention is achieved by adding a quantity of blood plasma test sample to a test tube containing the improved composition of this invention; the contents are then mixed by gently rocking the test tube and then allowing it to stand at room temperature for 30 minutes. During this time, colored fibrin strands or colored fibrin gels will form if intravascular coagulation has taken place and fibrin monomers and/or degradation products are present in the blood plasma. By gently shaking the test tube and visually observing for the presence of these colored fibrin strands and/or colored fibrin gels, positive identification of intravascular coagulation can be made. If neither colored fibrin strands nor colored fibrin gels appear, the test result is negative. It has also been found that the presence of fibrinogen and/or fibrinogen degradation products in blood plasma does not interfere with the specificity of end point of the improved test method of this invention. Recognition and identification of the thread-like fibrin strands, indicating early intravascular coagulation can be made in the presence of the feathery and flocculent precipitate resulting from precipitated fibrinogen and/or fibrinogen degradation products.

When utilizing the above-described serial dilution test method of the invention, 0.2 ml of blood plasma test sample are added to 0.2 ml of each of the serial dilutions of C and E described above; the blood plasma and the serial dilutions are mixed and visually observed, as described above, for the presence of colored fibrin strands or colored fibrin gels. The aforementioned serial dilution test method can be made semi-quantitative if it is run against standard plasma test solutions containing known concentrations of fibrin monomer.

For accurate positive/negative test results, without regard to quantities, it has been found possible to utilize only the second serial dilution in aforementioned serial dilution test method. Thus, a test composition containing 0.1% by weight of protamine sulfate and 0.00083% by weight of finely divided colored particles in a saline solution is prepared and the pH of the composition is adjusted to 6.50 ± 0.05. This last-mentioned reagent composition may be lyophilized for easier shipping and increased stability on storage. To perform the test, lyophilized composition is reconstituted and 0.2 ml of blood plasma test sample is added to 0.2 ml of the reconstituted reagent test composition. The test sample and the reagent composition are mixed by gentle rocking, the contents are allowed to stand at room temperature for 30 minutes and then shaken gently. The presence of colored fibrin strands and/or colored fibrin gels, if visually observable, is a positive indication of intravascular coagulation.

It has been found that concentrations of fibrin monomer in blood plasma as low as 0.89 mg per 100 ml of plasma are detectable using either this last-mentioned test method or the previously described serial dilution test method. An additional advantage of the improved reagent composition of this invention is that a minimal amount of training is necessary to obtain accurate test results. Simultaneous sample analysis is relatively rapid since all necessary reagents are pre-prepared. Thus, early recognition of intravascular coagulation is possible by utilizing the improved reagent compositions and improved test methods of this invention.

In order to further illustrate the practice of the invention the following examples are included:

EXAMPLE I

Preparation of Serial Dilutions of Protamine Sulfate Reagent Containing Colored Particles A. A 0.4% solution of protamine sulfate is prepared by dissolving 1.20 grams of protamine sulfate in 300 ml of 0.85% saline solution; the pH is adjusted to 6.50 ± 0.05 with 0.1 N sodium hydroxide.

B. 0.075 ml of India ink (Higgins, A-W-Faber Castell) is suspended in 300 ml of an 0.85% saline solution to provide 0.00165% by weight of lampblack particles.

C. An equal volume of (B) is gradually added to an equal volume of (A.), to provide a combined reagent composition containing 0.2% by weight of protamine sulfate and 0.00083% by weight of lampblack particles, and the pH is adjusted to 6.50 ± 0.05 with 0.1 N sodium hydroxide.

D. The remaining portion of (B) is diluted with an equal volume of 0.85% saline solution to provide 0.00083% by weight of lampblack particles; this suspension of colored particles is used to serially dilute (C) and provide a total of five serial dilutions of the combined reagent composition containing 0.2%, 0.1%, 0.05%, 0.025% and 0.125% of protamine sulfate, each of which contains 0.00083% by weight of lampblack particles.

EXAMPLE II

Determination of Intravascular Coagulation 0.2 ml of blood plasma test sample is added to 0.2 ml of each of the serial dilutions from (D.) in Example I above in separate containers. The blood plasma test sample and serial dilutions are mixed by gently rocking the individual containers and allowing them to stand at room temperature for 30 minutes. The individual containers are then shaken and observed for colored fibrin strands and colored fibrin gels as a positive indication of disseminated intravascular coagulation.

EXAMPLE III

Preparation of Protamine Sulfate Reagent Containing Colored Particles 0.2% protamine sulfate solution is prepared by dissolving 0.60 grams of protamine sulfate in 300 ml of 0.85% saline solution and adjusting to a pH of about 6.50 ± 0.05 with 0.1 N sodium hydroxide; adding 0.075 ml of India ink (Higgins, A-W-Faber Castell) to 300 ml of 0.85% saline solution to provide 0.00165% by weight of lampblack particles; gradually adding the India ink/saline solution to the protamine sulfate saline solution and re-adjusting to a pH of 6.50 ± 0.05; lyophilizing in 2.0 ml aliquots.

EXAMPLE IV

Determination of Intravascular Coagulation

A lyophilized aliquot of Example III is reconstituted with 2 ml of water and swirled gently to dissolve. 0.2 ml of blood plasma test sample are added to 0.2 ml of reconstituted reagent of Example III and mixed gently by rocking the container. The container is allowed to stand at room temperature for 30 minutes after which it is gently shaken and observed for the presence of colored fibrin strands and colored fibrin gels as a positive indication of disseminated intravascular coagulation.

We claim:

1. A test composition for detecting fibrin monomers and fibrin degradation products in blood plasma comprising a saline solution containing from about 0.0125% to about 0.2% by weight, of protamine sulfate, based on the total weight of the saline solution; and from about 0.00042% to about 0.00165% by weight of finely divided colored particles, based on the total weight of the saline solution, said colored particles being colloidally suspended in the saline solution; the pH of the saline solution adjusted to about 6.5.

2. A lyophilized composition of claim 1.

3. A composition according to claim 1 wherein the colored particles have a diameter of from about 90 to about 400 millimicrons.

4. A lyophilized composition of claim 3.

5. A composition according to claim 3 containing from about 0.025% to about 0.1% by weight of protamine sulfate and from about 0.00065% to about 0.001097% by weight of carbon black.

6. A lyophilized composition of claim 5.

7. A composition according to claim 5 containing about 0.1% by weight of protamine sulfate; and about 0.00083% by weight of lampblack particles.

8. A lyophilized composition of claim 7.

9. A method for preparing a composition for detecting fibrin monomers and fibrin degradation products in blood plasma comprising:

A. Preparing a saline solution containing from about 0.025% to about 0.4% by weight, of protamine sulfate, based on the total weight of the solution and adjusting the pH to about 6.50 ± 0.05;

B. Preparing a saline solution containing from about 0.00083% to about 0.00329% by weight, based on the total weight of the saline solution, of finely divided colored particles colloidally suspended in the saline solution;

C. Adding, slowly, an equal volume of solution (B) to an equal volume of solution (A) and adjusting the pH to about 6.50 ± 0.05.

10. A method according to claim 9 wherein, in an additional step, the composition is lyophilized.

11. A method according to claim 9 wherein, in step (A), from about 0.05% to about 0.2% by weight of protamine sulfate is present; and, in step (B.), from about 0.0013% to about 0.002184% by weight of carbon black is present.

12. A method according to claim 11 wherein the composition is lyophilized.

13. A method according to claim 11 wherein, in step (A.), about 0.2% by weight of protamine sulfate is present; and in step (B), about 0.00165% by weight of lampblack is present in the form of an India ink suspension.

14. A method according to claim 13 wherein, in an additional step, the composition is lyophilized.

15. A method for detecting the presence of fibrin monomers and fibrin degradation products in blood plasma which comprises:

A. Preparing a saline solution containing about 0.4% by weight of protamine sulfate and adjusting to a pH of about 6.50 ± 0.05;

B. Preparing a saline solution containing about 0.00165% by weight of finely divided colored particles colloidally suspended in the saline solution;

C. Gradually adding a volume of (B) to an equal volume of (A) to provide 0.2% by weight of protamine sulfate and 0.00083% by weight of finely divided colored particles in the combined test composition, and adjusting to a pH of about 6.50 ± 0.05;

D. Diluting a remaining portion of (B) with additional saline solution to provide 0.00083% by weight of finely divided colored particles colloidally suspended in the saline solution;

E. Serially diluting (C) with (D) to provide a total of five test compositions containing 0.2%, 0.1%, 0.05%, 0.025% and 0.0125% by weight of protamine sulfate, and 0.00083% by weight of finely divided colored particles in each respective serial dilution;

F. Adding 0.2 ml of blood plasma test sample to 0.2 ml of each of the serial dilutions of (E):

G. Mixing blood plasma and the serial dilutions of (F) by gently rocking individual containers and allowing them to stand at room temperature for about 30 minutes;

H. Gently shaking the individual containers of (G) and visually observing the presence of colored fibrin strands and colored fibrin gels as a positive indication of the presence of fibrin monomers and fibrin degradation products.

16. A method for detecting the presence of fibrin monomers and fibrin degradation products in blood plasma which comprises:

A. Reconstituting the lyophilized composition of claim 8 with water;

B. Adding 0.2 ml of blood plasma test sample to 0.2 ml of (A) in a container;

C. Mixing the contents of (B) by gently rocking the container and allowing it to stand at room temperature for about 30 minutes;

D. Gently shaking the container and visually observing the presence of colored fibrin strands and colored fibrin gels as a positive indication of the presence of fibrin monomers and fibrin degradation products.

* * * * *